(12) United States Patent
Frenger et al.

(10) Patent No.: US 10,320,530 B2
(45) Date of Patent: Jun. 11, 2019

(54) INDICATION OF HYBRID AUTOMATIC REPEAT REQUEST FEEDBACK BY SYNCHRONIZATION SIGNAL

(71) Applicant: Telefonaktiebolaget LM Ericsson (publ), Stockholm (SE)

(72) Inventors: Pål Frenger, Linköping (SE); Erik Eriksson, Linköping (SE); Jonas Fröberg Olsson, Ljungsbro (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 184 days.

(21) Appl. No.: 15/500,775

(22) PCT Filed: Oct. 25, 2016

(86) PCT No.: PCT/EP2016/075636
§ 371 (c)(1),
(2) Date: Jan. 31, 2017

(87) PCT Pub. No.: WO2018/077383
PCT Pub. Date: May 3, 2018

(65) Prior Publication Data
US 2018/0331789 A1    Nov. 15, 2018

(51) Int. Cl.
*H04W 4/00* (2018.01)
*H04L 1/16* (2006.01)
(Continued)

(52) U.S. Cl.
CPC .......... *H04L 1/1678* (2013.01); *H04L 1/1671* (2013.01); *H04L 1/1812* (2013.01);
(Continued)

(58) Field of Classification Search
CPC . H04L 1/16; H04L 1/18; H04L 1/1861; H04L 1/1887; H04L 1/1896;
(Continued)

(56) References Cited

U.S. PATENT DOCUMENTS 8,243,672 B2 *  8/2012  Park ................... H04W 56/004
                                                   370/281
9,402,255 B2 *  7/2016  Lohr ................. H04W 72/0446
(Continued)

FOREIGN PATENT DOCUMENTS

EP          2903357 A1     5/2015

OTHER PUBLICATIONS

3rd Generation Partnership Program. "Technical Specification Group Radio Access Network; Evolved Universal Terrestrial Radio Access (E-UTRA); Medium Access Control (MAC) protocol specification (Release 14)"; 3GPP TS 36.321 V14.0.0; Sep. 2016; pp. 1-96; Sophia Antipolis, Valbonne, France.

*Primary Examiner* — Frank Duong
(74) *Attorney, Agent, or Firm* — Coats & Bennett, PLLC

(57) ABSTRACT

A node (100) of a wireless communication network receives a synchronization signal from a radio device (10). Based on the received synchronization signal, the node determines a time alignment configuration for uplink radio transmissions from the radio device to the wireless communication network. Based on the received synchronization signal, the node further determines Hybrid Automatic Repeat Request feedback information for at least one downlink radio transmission from the wireless communication network to the radio device (10). The node (100) indicates the determined time alignment configuration to the radio device (10). Based on the determined Hybrid Automatic Repeat Request feedback information, the node controls retransmission of the at least one downlink radio transmission.

26 Claims, 7 Drawing Sheets

(51) Int. Cl.
*H04L 1/18* (2006.01)
*H04W 56/00* (2009.01)

(52) U.S. Cl.
CPC .......... *H04L 1/1854* (2013.01); *H04L 1/1887* (2013.01); *H04W 56/0015* (2013.01); *H04W 56/0045* (2013.01)

(58) Field of Classification Search
CPC .......... H04W 56/0045; H04W 56/001; H04W 72/04; H04W 72/0406; H04W 74/08; H04W 74/0833
See application file for complete search history.

(56) References Cited

U.S. PATENT DOCUMENTS

| | | | |
|---|---|---|---|
| 9,425,926 B2* | 8/2016 | Chun | .................... H04L 1/1822 |
| 9,699,746 B2* | 7/2017 | Quan | ................ H04W 56/0045 |
| 2013/0258958 A1 | 10/2013 | Dinan | |
| 2015/0103811 A1 | 4/2015 | Marinier et al. | |
| 2016/0072601 A1 | 3/2016 | Ranade et al. | |
| 2016/0323070 A1* | 11/2016 | Chen | .................... H04L 1/1861 |

* cited by examiner

INDICATION OF HYBRID AUTOMATIC REPEAT REQUEST FEEDBACK BY SYNCHRONIZATION SIGNAL

TECHNICAL FIELD

The present invention relates to methods for controlling radio transmissions and to corresponding devices and systems.

BACKGROUND

In wireless communication technologies, synchronization procedures may be used for enabling efficient uplink (UL) radio transmissions of radio devices, also referred to as a UE (user equipment), to a base station. For example, in the LTE radio technology specified by 3GPP ($3^{rd}$ Generation Partnership Project) UL radio transmissions are based on an orthogonal modulation scheme called DFT-S-OFDM (Discrete Fourier Transform Spread Orthogonal Frequency Division Multiplexing) that relies on tight synchronization of UL transmissions for maintaining orthogonality. Here, the synchronization aims at controlling the timing of UL transmissions of different UEs in such a way that the UL radio transmissions are time alignment upon reception by the base station. For this purpose, each of the UEs is configured with a timing advance (TA) value, which typically depends on the UE's position relative to the base station.

For enabling configuration of the TA value, the UEs may transmit UL signals to be used by the base station for determining the TA value, which is then indicated by the base station to the UE. These UL signals may for example be a random access preamble, a dedicated UL synchronization signal, a UL demodulation reference signal, or the like. Based on the time alignment provided by the TA value, the UE may then perform time-aligned DFT-S-OFDM radio transmissions, e.g., on a PUCCH (Physical UL Control Channel) or on a PUSCH (Physical UL Shared Channel). The time aligned DFT-S-OFDM radio transmissions may be used for conveying user plane data or UL control information.

One specific type of UL control information is HARQ (Hybrid Automatic Repeat Request) feedback for downlink (DL) radio transmissions from the base station to the UE. For the LTE radio technology, HARQ protocol functionalities are specified in 3GPP TS 36.321 V14.0.0. (2016-09). By means of the HARQ feedback, the UE can indicate to the base station whether a DL radio transmission from the base station was successfully decoded by the UE (by sending a HARQ ACK) or a DL radio transmission from the base station was not successfully decoded by the UE (by sending a HARQ NACK). Upon receiving a HARQ NACK, the bases station decide to perform a retransmission of the unsuccessful DL radio transmission. According to 3GPP TS 36.213 V14.0.0 (2016-09), the HARQ feedback is transmitted on the PUCCH or PUSCH.

Since the HARQ feedback is transmitted on the PUCCH or PUSCH, the UE thus needs to maintain its time alignment with the base station, which requires regular transmission of UL signals. This may cause undesirable energy consumption at the UE and also consumes radio resources for transmission of signals between the UE and the base station. If the UE loses its time alignment with the base station, transmissions may be delayed because before the UE can transmit HARQ feedback to the base station, it may first need to establish time alignment. On the other hand, DL radio transmissions are typically possible even if there is no valid time alignment of the UE.

Accordingly, there is a need for techniques which allow for efficient transmission of HARQ feedback for DL radio transmissions.

SUMMARY

According to an embodiment of the invention, a method of controlling radio transmissions in a wireless communication network is provided. According to the method, a node of the wireless communication network receives a synchronization signal from a radio device. Based on the received synchronization signal, the node determines a time alignment configuration for UL radio transmissions from the radio device to the wireless communication network. Based on the received synchronization signal, the node further determines HARQ feedback information for at least one DL radio transmission from the wireless communication network to the radio device. Based on the determined HARQ feedback information, the node controls retransmission of the at least one DL radio transmission.

According to a further embodiment of the invention, a method of controlling radio transmissions in a wireless communication network is provided. According to the method, a radio device determines HARQ feedback information for at least one DL radio transmission from the wireless communication network to the radio device. By sending a synchronization signal, the radio device indicates the HARQ feedback information to the wireless communication network. The synchronization signal enables a node of the wireless communication network to determine a time alignment configuration for UL radio transmissions from the radio device to the wireless communication network.

According to a further embodiment of the invention, a node for a wireless communication network is provided. The node is configured to receive a synchronization signal from a radio device. Further, the node is configured to determine, based on the received synchronization signal, a time alignment configuration for UL radio transmissions from the radio device to the wireless communication network. Further, the node is configured to determine, based on the received synchronization signal, HARQ feedback information for at least one DL radio transmission from the wireless communication network to the radio device. Further, the node is configured to control retransmission of the at least one DL radio transmission based on the determined HARQ feedback information.

According to a further embodiment of the invention, a radio device is provided. The radio device is configured to determine HARQ feedback information for at least one DL radio transmission from the wireless communication network to the radio device. Further, the radio device is configured to indicate, by sending a synchronization signal, the HARQ feedback information to the wireless communication network. The synchronization signal enables a node of the wireless communication network to determine a time alignment configuration for UL radio transmissions from the radio device to the wireless communication network.

According to a further embodiment of the invention, a system is provided. The system comprises a radio device and a node of a wireless communication network. The radio device is configured to determine HARQ feedback information for at least one DL radio transmission from the wireless communication network to the radio device. Further, the radio device is configured to indicate, by sending a synchronization signal, the HARQ feedback information to the wireless communication network. The node is configured to receive the synchronization signal from the radio device. Further, the node is configured to determine, based on the received synchronization signal, a time alignment configuration for UL radio transmissions from the radio device to the wireless communication network. Further, the node is configured to determine the HARQ feedback information based on the received synchronization signal. Further, the node is configured to control retransmission of the at least one DL radio transmission based on the determined HARQ feedback information.

According to a further embodiment of the invention, a computer program or computer program product is provided, e.g., in the form of a non-transitory storage medium, which comprises program code to be executed by at least one processor of a node of a wireless communication network. Execution of the program code causes the node to receive a synchronization signal from a radio device. Further, execution of the program code causes the node to determine, based on the received synchronization signal, a time alignment configuration for UL radio transmissions from the radio device to the wireless communication network. Further, execution of the program code causes the node to determine, based on the received synchronization signal, HARQ feedback information for at least one DL radio transmission from the wireless communication network to the radio device. Further, execution of the program code causes the node to control retransmission of the at least one DL radio transmission based on the determined HARQ feedback information.

According to a further embodiment of the invention, a computer program or computer program product is provided, e.g., in the form of a non-transitory storage medium, which comprises program code to be executed by at least one processor of a radio device. Execution of the program code causes the radio device to determine HARQ feedback information for at least one DL radio transmission from the wireless communication network to the radio device. Further, execution of the program code causes the radio device to indicate, by sending a synchronization signal, the HARQ feedback information to the wireless communication network. The synchronization signal enables a node of the wireless communication network to determine a time alignment configuration for UL radio transmissions from the radio device to the wireless communication network.

Details of such embodiments and further embodiments will be apparent from the following detailed description of embodiments.

DETAILED DESCRIPTION OF EMBODIMENTS

Figure 1:
FIG. 1 schematically illustrates a scenario in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network. The wireless communication network is assumed to be based on a radio technology in which DL radio transmissions from the wireless communication network to a radio device are based on a HARQ protocol. For example, the wireless communication network may be based on the LTE radio technology and utilize a HARQ protocol as specified in 3GPP TS 36.321 V14.0.0 (2016-09). It is noted that typically also UL radio transmissions from the radio device to the wireless communication network may be based on such HARQ protocol. In the examples as further detailed below, the radio device is assumed to be a UE, e.g., a mobile phone, smartphone, tablet computer, a laptop computer, a personal digital assistant (PDA), or other type of wireless communication device and the radio transmissions are performed between the UE and a node of the wireless communication network, in particular an access node, such as an eNB of the LTE radio technology. However, it is noted that the illustrated concepts could also be applied to other kinds of radio devices, such as relay nodes. Further, it is noted that the illustrated concepts may be applied in connection with various radio technologies, including not only the LTE radio technology but for example also 5G (5fth Generation) radio technologies, such as the NR (New Radio) technology developed by 3GPP.

The illustrated concepts aim at enabling efficient transmission of HARQ feedback from the UE to the wireless communication network. This is achieved by allowing the transmission of the HARQ feedback also in situations where the UE is not synchronized to the wireless communication network, e.g., because validity of a time alignment configuration of the UE, such as TA value as configured for the UE, has expired. If the UE is not synchronized and has HARQ feedback to transmit, it indicates the HARQ feedback by sending a synchronization signal, in the following referred to as USS (UL synchronization signal). The USS signal can be a dedicated synchronization signal as defined to be transmitted by the UE in a synchronization procedure for UL radio transmissions, a random access preamble as defined to be transmitted by the UE in a random access procedure, either contention-based or contention free, or a UL demodulation reference signal. As compared to regular UL radio transmissions, the transmission of the USS does not require synchronization of the UE, but rather is usable by the wireless communication network to establish or re-establish synchronization of the UE. This may for example involve estimating a propagation delay of the USS from the UE to the node of the wireless communication network and configuring the UE to perform the UL radio transmissions with a corresponding time alignment configuration, e.g., a corresponding TA value, so that the UL radio transmissions of different UEs are time aligned upon reception by the node. The time alignment in turn allows for efficient UL radio transmissions on the basis of orthogonal time/frequency resources, e.g., by using DFT-S-OFDM. In view of the above, the UL radio transmissions which require synchronization will in the following also be referred to as time-aligned UL radio transmissions, while the other UL radio transmissions, e.g., transmission of the USS, will be referred to as non-time aligned UL radio transmissions.

By enabling the transmission of HARQ feedback without valid time alignment configuration of the UE, performance in terms of reduced delay or latency of data transfers, reduced energy consumption of the UE and thus longer battery-life of the UE, reduced energy consumption on the network side, efficient usage of radio resources, reduced interference, reduced control overhead, or the like. Specifically, a reduced delay or latency may be achieved by not requiring a synchronization procedure before transmitting data by DL radio transmissions. Reduced energy consumption of the UE and longer battery-life of the UE may be achieved reducing the time periods in which the UE maintains its synchronization and enabling the UE to stay longer in in a sleep state or other low power mode. Less control overhead can be achieved by reducing control signalling associated with regular synchronization procedures. This may at the same time reduce a contribution to interference which is due to such control signalling. Further, the reduced amount of control signalling may also allow for achieving reduced energy consumption on the network side.

FIG. 1 shows an exemplary scenario in which a UE 10 is connected to an access node 100 of the wireless communication network. As illustrated, the access node 100 sends one or more DL radio transmissions to the UE 10. The UE 10 sends a USS and HARQ feedback to the access node 100. The HARQ feedback indicates whether the DL radio transmission(s) were successfully decoded by the UE 10. This may involve that the UE 10 sends a positive acknowledgement, denoted as HARQ ACK, for a DL radio transmission which was successfully decoded by the UE 10. Further, this may involve that the UE 10 sends a negative acknowledgement, denoted as HARQ NACK, for a DL radio transmission which was not successfully decoded by the UE 10. In some scenarios, decoding of the DL radio transmission being unsuccessful may also be deduced from the absence of a positive acknowledgement, without requiring explicit transmission of the negative acknowledgement.

As explained above, the UE 10 may use the USS to indicate the HARQ feedback to the access node 100. In this way, the HARQ feedback can be transmitted without requiring that the UE 10 maintains synchronization with the access node 100.

To enable utilization of the USS for indicating the HARQ feedback, the UE 10 may be configured to transmit two different types of the USS, in the following referred to as USS1, indicating a HARQ ACK, and USS2, indicating a HARQ NACK. These different types of the USS may for example differ with respect to radio resources on which the USS is transmitted. That is to say, USS1 may be transmitted on radio resources which at least in part differ from radio resources on which USS2 is transmitted. In addition or as an alternative, USS1 and USS2 may also be based on different symbol sequences, e.g., different Zadoff-Chu sequences.

The configuration of the UE 10 with respect to the transmission of the different types of the USS may be accomplished in various ways. For example, the configuration could be accomplished by RRC (Radio Resource Control) signaling to the UE 10. Alternatively or in addition, the configuration could be accomplished by DL control information (DCI) transmitted on a physical DL control channel to the UE 10, e.g., on a PDCCH of the LTE radio technology.

For example, the DCI used to schedule the DL radio transmission to the UE 10 could also be used to indicate the configuration for transmission of the HARQ feedback by the USS to the UE 10. For this purpose, a corresponding DCI format could be defined, which is used for scheduling a DL transmission when the UE 10 is not synchronized.

The DCI may explicitly indicate the radio resources to be used for sending the different types of the USS. Further, these radio resources could also be indicated in an implicit manner, e.g., based on a mapping of a control channel element (CCE) used for transmission of the DCI to radio resources to be used for sending the USS. For example, a search-space in which the UE 10 attempts receiving the DCI could consist of N different CCE combinations and there could be N different radio resources that may be used for transmission of the USS. Based on where the DCI for the UE 10 is found and the mapping of CCE to radio resources, the UE 10 may then determine which radio resources to use for sending the USS.

Further, the configuration of the UE 10 with respect to the transmission of the different types of the USS may also be accomplished by MAC (Medium Access Control) signalling. For example, the configuration could be indicated by a MAC control element embedded in the DL radio transmission. Here, it is noted that since in this case the UE 10 needs to successfully decode the DL radio transmission to obtain the configuration, this configuration may define how to indicate a HARQ ACK by the USS, and a HARQ NACK may be indicated implicitly by the absence of a HARQ ACK, e.g., by the absence of the USS in the configured radio resources.

Figure 2:
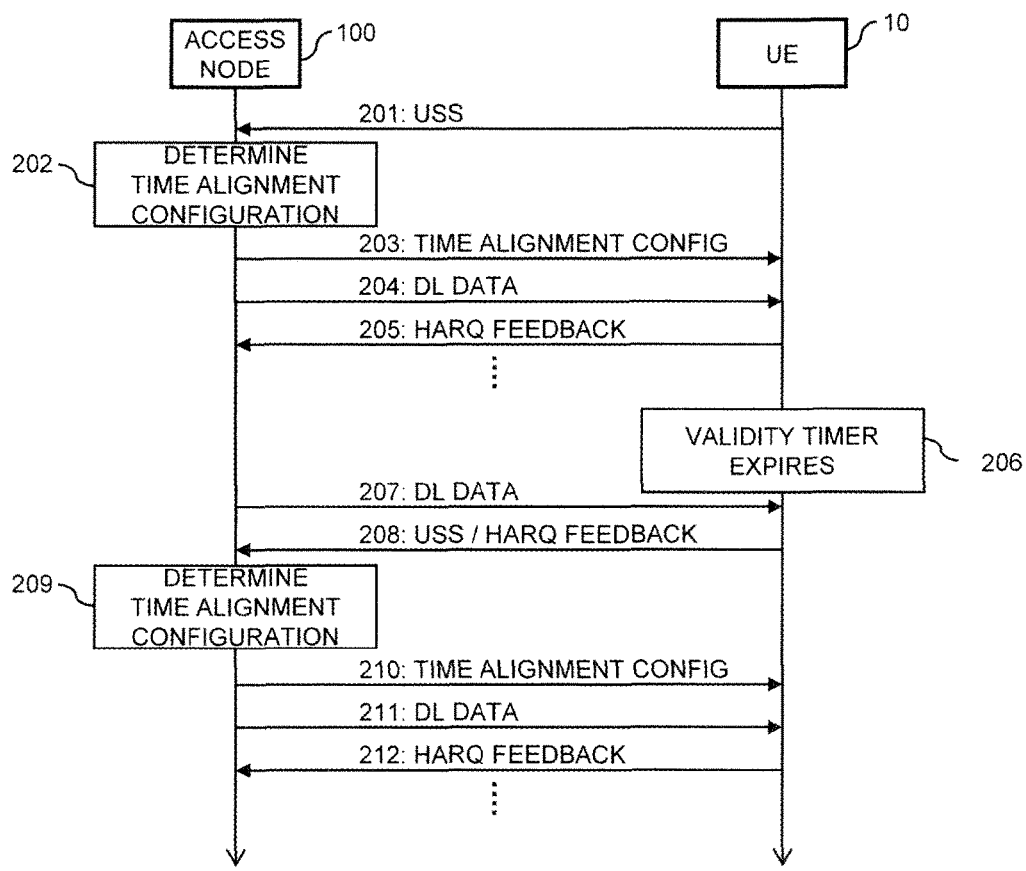
FIG. 2 schematically illustrates an example of processes according to an embodiment of the invention.

FIG. 2 shows an example of processes which are based on the concepts as outlined above. The processes of FIG. 2 involve the access node 100 and the UE 10.

In the example of FIG. 2, it is assumed that the UE 10 initially synchronizes to the wireless communication network, which involves that the UE 10 sends USS 201. The USS 201 is received by the access node 100 and used for determining a time alignment configuration for the UE 10, as indicated by block 202. The time alignment configuration may for example define a TA value to be applied by the UE 10 for controlling timing of its UL radio transmissions. The access node 100 may for example determine TA values for different UEs in such a way that the UL radio transmissions by the different UEs are time aligned when received by the access node 100.

The access node 100 then sends an indication 203 of the determined time alignment configuration to the UE 10. The indication may for be provided in the form of a TA command defined on the MAC layer, such as specified in 3GPP TS 36.321 V14.00.

The UE 10 then applies the indicated time alignment configuration when performing time-aligned UL radio transmissions on orthogonal time-frequency resources. For example, like illustrated in the example of FIG. 2, the access node 100 may send DL data 204 by a DL radio transmission to the UE 10, and the UE 10 may send HARQ feedback 205 for the DL radio transmission by a time-aligned UL radio transmission to the access node 100. As mentioned above, the HARQ feedback may include a HARQ ACK, indicating that the DL radio transmission was successfully decoded by the UE 10, or a HARQ NACK, indicating that the DL radio transmission could not be successfully decoded by the UE 10.

The UE 10 may continue to utilize the indicated time alignment configuration when performing time-aligned UL radio transmissions on orthogonal time-frequency resources as long as the time-alignment configuration is valid. However, at some time the indicated time alignment configuration may become invalid. For example, the UE 10 may be configured with a timer (TA timer), and this timer may expire at some time, as illustrated by block 206. The UE 10 may then assume that the previously indicated time alignment configuration is invalid and should no longer be utilized for time-aligned UL radio transmissions on orthogonal time-frequency resources. By limiting the validity of the time alignment configuration it can be avoided that the UE 10 performs UL radio transmissions on orthogonal time-frequency resources on the basis of an inappropriate time alignment configuration, with the risk of failure of the UL radio transmissions and/or adverse effects on UL radio transmissions by other UEs. It is noted that also the access node 100 may keep track of the validity of the time alignment configuration indicated to the UE 10, e.g., by implementing a corresponding timer.

In the illustrated example, the previously indicated time alignment configuration becoming invalid does not trigger re-establishment of a valid time alignment configuration. Rather, the UE 10 is allowed to lose its valid time alignment configuration. Further, the access node 100 is allowed to send one or more further DL radio transmissions to the UE 10, without requiring beforehand re-establishment of a valid time alignment configuration for the UE 10, as illustrated by the transmission of DL data 207 by a DL radio transmission from the access node 100 to the UE 10. In order to avoid delays, the UE 10 then indicates the HARQ feedback for the DL radio transmission by sending the USS 208. From the USS 208, the access node 100 determines the HARQ feedback for the DL radio transmission of the DL data 207. The USS 208 may be transmitted on certain radio resources, and the transmission of the USS 208 on these radio resources may indicate a HARQ ACK, while the absence of the USS on these radio resources may indicate a HARQ NACK. Further, two different types of USS could be configured, i.e., the above-mentioned USS1 and USS2, and the USS 208 could correspond to USS1 to indicate a HARQ ACK or to USS2 to indicate a HARQ NACK.

As further illustrated by block 209, the access node 100 may also determine a new valid time alignment configuration based on the received USS 208 and sends an indication 210 of the determined time alignment configuration to the UE 10. After that, the UE 10 may apply the indicated new time alignment configuration when performing time-aligned UL radio transmissions on orthogonal time-frequency resources. For example, the access node 100 may send DL data 211 by a DL radio transmission to the UE 10, and the UE 10 may send HARQ feedback 212 for the DL radio transmission by a time-aligned UL radio transmission to the access node 100.

It is noted that in some scenarios the UE 10 could also continue to utilize the USS for sending the HARQ feedback to the access node 100, rather than providing the HARQ feedback 212 by a time-aligned UL radio transmission. For example, the access node 100 could indicate a number of DL radio transmissions and/or a time interval for which the UE 10 shall utilize the USS for indicating the HARQ feedback. This option may for example be utilized if it is uncertain whether the indicated time alignment configuration can be successfully applied by the UE 10, e.g., because the UE 10 is subject to rapidly changing radio channel conditions and/or moving fast. In some scenarios the UE 10 may also decide whether to utilize the USS for sending the HARQ feedback or to rather utilize a time-aligned UL radio transmission for sending the HARQ feedback, possibly at the cost of some additional delay. In the latter scenario, the access node 100 may monitor both the USS and time-aligned UL radio transmissions for the HARQ feedback.

Further, in some scenarios there may be two or more DL radio transmissions while the UE 10 has no valid time alignment configuration. In this case, the UE 10 two or more different types of the USS may be used to indicate the HARQ feedback information for these DL radio transmissions. For example, in the case of two DL radio transmissions, a first type of the USS may be used to indicate the HARQ feedback for a first DL radio transmission, and a second type of the USS may be used to indicate the HARQ feedback for a second DL radio transmission. These different types of the USS may for example differ with respect to radio resources on which the USS is transmitted and/or may be based on different symbol sequences, e.g., different Zadoff-Chu sequences.

Figure 3:
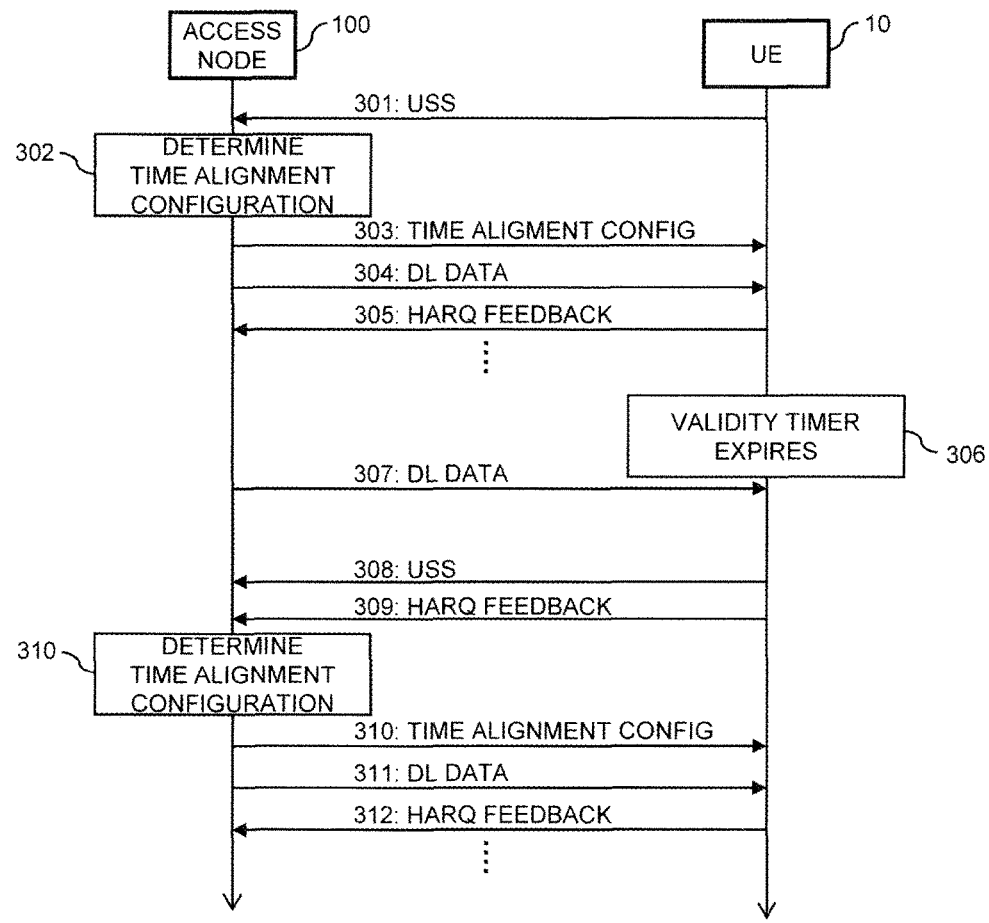
FIG. 3 schematically illustrates a further example of processes according to an embodiment of the invention.

FIG. 3 shows a further example of processes which are based on the concepts as outlined above. The processes of FIG. 2 involve the access node 100 and the UE 10.

Also in the example of FIG. 3, it is assumed that the UE 10 initially synchronizes to the wireless communication network, which involves that the UE 10 sends USS 201. The USS 301 is received by the access node 100 and used for determining a time alignment configuration for the UE 10, as indicated by block 302. The time alignment configuration may for example define a TA value to be applied by the UE 10 for controlling timing of its UL radio transmissions. The access node 100 may for example determine TA values for different UEs in such a way that the UL radio transmissions by the different UEs are time aligned when received by the access node 100.

The access node 100 then sends an indication 303 of the determined time alignment configuration to the UE 10. The indication may for be provided in the form of a TA command defined on the MAC layer, such as specified in 3GPP TS 36.321 V14.00.

The UE 10 then applies the indicated time alignment configuration when performing time-aligned UL radio transmissions on orthogonal time-frequency resources. For example, like illustrated in the example of FIG. 3, the access node 100 may send DL data 304 by a DL radio transmission to the UE 10, and the UE 10 may send HARQ feedback 305 for the DL radio transmission by a time-aligned UL radio transmission to the access node 100. As mentioned above, the HARQ feedback may include a HARQ ACK, indicating that the DL radio transmission was successfully decoded by the UE 10, or a HARQ NACK, indicating that the DL radio transmission could not be successfully decoded by the UE 10.

The UE 10 may continue to utilize the indicated time alignment configuration when performing time-aligned UL radio transmissions on orthogonal time-frequency resources as long as the time-alignment configuration is valid. However, at some time the indicated time alignment configuration may become invalid. For example, the UE 10 may be configured with a timer (TA timer), and this timer may expire at some time, as illustrated by block 306. The UE 10 may then assume that the previously indicated time alignment configuration is invalid and should no longer be utilized for time-aligned UL radio transmissions on orthogonal time-frequency resources. By limiting the validity of the time alignment configuration it can be avoided that the UE 10 performs UL radio transmissions on orthogonal time-frequency resources on the basis of an inappropriate time alignment configuration, with the risk of failure of the UL radio transmissions and/or adverse effects on UL radio transmissions by other UEs. It is noted that also the access node 100 may keep track of the validity of the time alignment configuration indicated to the UE 10, e.g., by implementing a corresponding timer.

In the illustrated example, the previously indicated time alignment configuration becoming invalid does not trigger re-establishment of a valid time alignment configuration. Rather, the UE 10 is allowed to lose its valid time alignment configuration. Further, the access node 100 is allowed to send one or more further DL radio transmissions to the UE 10, without requiring beforehand re-establishment of a valid time alignment configuration for the UE 10, as illustrated by the transmission of DL data 307 by a DL radio transmission from the access node 100 to the UE 10. In order to avoid delays, the UE 10 then first sends the USS 308, followed by a non-time aligned UL radio transmission conveying the HARQ feedback 309 for the DL radio transmission. The access node 100 receives the USS 308 and utilizes the received USS 308 to estimate the timing of the UL radio transmission indicating the HARQ feedback and to enable decoding of the UL radio transmission.

As further illustrated by block 310, the access node 100 may also determine a new valid time alignment configuration based on the received USS 308 and send an indication 311 of the determined time alignment configuration to the UE 10. After that, the UE 10 may apply the indicated new time alignment configuration when performing time-aligned UL radio transmissions on orthogonal time-frequency resources. For example, the access node 100 may send DL data 312 by a DL radio transmission to the UE 10, and the UE 10 may send HARQ feedback 313 for the DL radio transmission by a time-aligned UL radio transmission to the access node 100.

In some scenarios, the USS may also be used for other purposes. For example, the utilization of the USS for indicating the HARQ feedback may also be combined with utilization of the USS for transmission of scheduling requests from the UE 10 to the access node 100. This may be accomplished by configuring the UE 10 and the access node 100 in such a way that transmission of the USS in the absence of a prior DL radio transmission is interpreted as a scheduling request, requesting the access node 100 to allocate radio resources to the UE 10, which may then be used by the UE 10 for an UL radio transmission. Transmission of the USS in response to a DL radio transmission to the UE 10 may in turn be interpreted as HARQ feedback. To avoid false detection of HARQ ACKs, two different types of the USS may be configured for the transmission of the HARQ feedback and the scheduling requests: a first type of the USS to be used for indicating a HARQ NACK, and a second type of the USS for indicating a HARQ NACK or a scheduling request.

Figure 4:
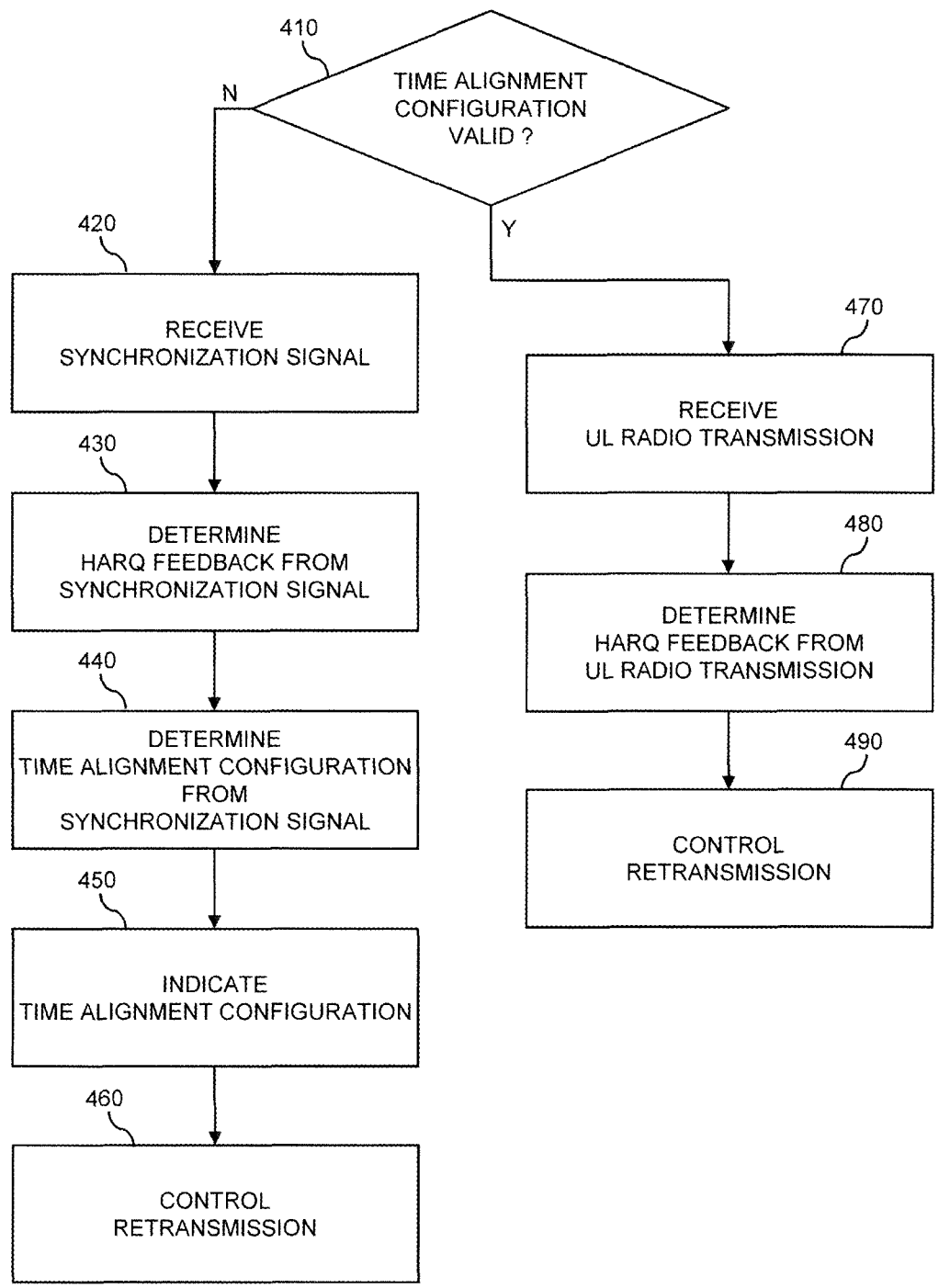
FIG. 4 shows a flowchart for schematically illustrating a method according to an embodiment of the invention.

FIG. 4 shows a flowchart for illustrating a method of controlling radio transmissions in a wireless communication network, in particular radio transmissions between a radio device and the wireless communication network. The method of FIG. 4 may be utilized for implementing the illustrated concepts in a node of the wireless communication network, such as the above-mentioned access node 100. If a processor-based implementation of the node is used, the steps of the method may be performed by one or more processors of the node.

In such a case the node may further comprise a memory in which program code for implementing the below described functionalities is stored.

At step 410, the node may determine whether the radio device has a valid time alignment configuration for UL radio transmissions from the radio device to the wireless communication network. For example, upon expiry of a timer, a time alignment configuration as previously indicated to the radio device may assumed to be invalid. The time alignment configuration may for example define a TA value to be applied by the radio device for controlling the timing of the UL radio transmissions, e.g., by delaying the UL radio transmission in accordance with the TA value.

If at step 410 the radio device is found to have no valid time alignment configuration, as indicated by branch "N", the method may continue with step 420. At step 420, the node receives a synchronization signal from the radio device, such as the above-mentioned USS. Here it is noted that the synchronization signal may correspond to any kind of signal which may be used for estimating a propagation delay of an UL radio transmission from the radio device to the wireless communication network, including dedicated synchronization signals and random access preambles.

By sending control information to the radio device the node may configure the radio device with respect to the transmission of the synchronization signal, in particular with respect to how the synchronization signal is to be used for transmission of HARQ feedback information for a DL radio transmission. The control information may indicate UL radio resources for transmission of the synchronization signal. The node may send the control information in DL control information for controlling the at least one DL radio transmission. Alternatively or in addition, the node may send the control information by higher layer signalling, e.g., by RRC signalling and/or by MAC signalling. In some scenarios, the UL radio resources for transmission of the synchronization signal may also depend on DL radio resources used for sending DL control information for controlling the at least one DL radio transmission, e.g., based on a mapping of CCEs of a physical DL control channel to UL resources for transmission of the synchronization signal.

At step 430, the node determines, based on the synchronization signal received at step 420, HARQ feedback information for at least one DL radio transmission from the wireless communication network to the radio device.

In response to detecting a first type of the synchronization signal, the node may determine the HARQ feedback information as including a positive acknowledgement indicating successful reception of the at least one DL radio transmission, i.e., as including an HARQ ACK for the at least one DL radio transmission. In response to detecting a second type of the synchronization signal, the node may determine the HARQ feedback information as including a negative acknowledgement indicating failed reception of the at least one DL radio transmission, i.e., as including an HARQ NACK for the at least one DL radio transmission. The first type of the synchronization signal and the second type synchronization signal may differ with respect to the radio resources used for transmission of the synchronization signal and/or with respect to a symbol sequence transmitted with the synchronization signal. In some scenarios, absence of the synchronization signal on radio resources configured for the transmission of the synchronization signal may also be interpreted as an HARQ NACK.

In some scenarios, the node may use the synchronization signal as the basis for estimating a timing of a non-time aligned UL radio transmission from the radio device. Based on the estimated timing, the node may then receive the non-time aligned UL radio transmission determine the HARQ feedback information from the non-time aligned UL radio transmission from the radio device. An example of corresponding processes is explained in connection with FIG. 3.

In some scenarios, in response to detecting the synchronization signal while not expecting HARQ feedback information from the radio device, e.g., because there is no unacknowledged DL radio transmission to the radio device, the node may also interpret the synchronization signal as a scheduling request, allocate UL radio resources to the radio device, and indicating the allocated UL radio resources to the radio device.

At step 440, the node determines, from the synchronization signal received at step 420, a time alignment configuration for UL radio transmissions from the radio device to the wireless communication network. The time alignment configuration may for example define a TA value to be applied by the radio device for controlling the timing of the UL radio transmissions, e.g., by delaying the UL radio transmission in accordance with the TA value. For determining the time alignment configuration, the node may for example measure a propagation delay of the synchronization signal and use this as an estimate for a propagation delay of an UL radio transmission from the radio device to the wireless communication network. In some scenarios the node may also determine that no time alignment for UL radio transmissions is needed for the radio device. In other words, the time alignment configuration may also correspond to a non-time aligned state.

At step 450, the node may send an indication of the time alignment configuration determined at step 440 to the radio device. This may for example involve indicating a TA value by a timing advance command. In some scenarios, the node may also refrain from sending the indication of the time alignment configuration, e.g., when no time alignment for UL radio transmissions is needed for the radio device or when the radio device may continue to apply a previous time alignment configuration, e.g., the time alignment configuration which was found to be invalid at step 410.

At step 460, the node may control retransmission of the at least one DL radio transmission based on the HARQ feedback information determined at step 430. For example, if the HARQ feedback information includes an HARQ NACK for the at least one DL radio transmission, the node may initiate a retransmission of the at least one DL radio transmission.

If at step 410 the radio device is found to have a valid time alignment configuration, as indicated by branch "Y", the method may continue with step 470. At step 470, the node receives a time-aligned UL radio transmission from the radio device, i.e., a UL radio transmission which is based on the valid time alignment configuration of the radio device. The UL radio transmission may be a UL radio transmission on a data channel, such as the PUSCH of the LTE radio technology, are a UL radio transmission on a control channel, such as the PUCCH of the LTE radio technology. The UL radio transmission received at step 470 may be performed in an efficient manner on orthogonal time frequency resources.

At step 480, the node determines, based on the UL radio transmission received at step 470, HARQ feedback information for at least one DL radio transmission from the wireless communication network to the radio device.

At step 490, the node may control retransmission of the at least one DL radio transmission based on the HARQ feedback information determined at step 480. For example, if the HARQ feedback information includes an HARQ NACK for the at least one DL radio transmission, the node may initiate a retransmission of the at least one DL radio transmission.

Figure 5:
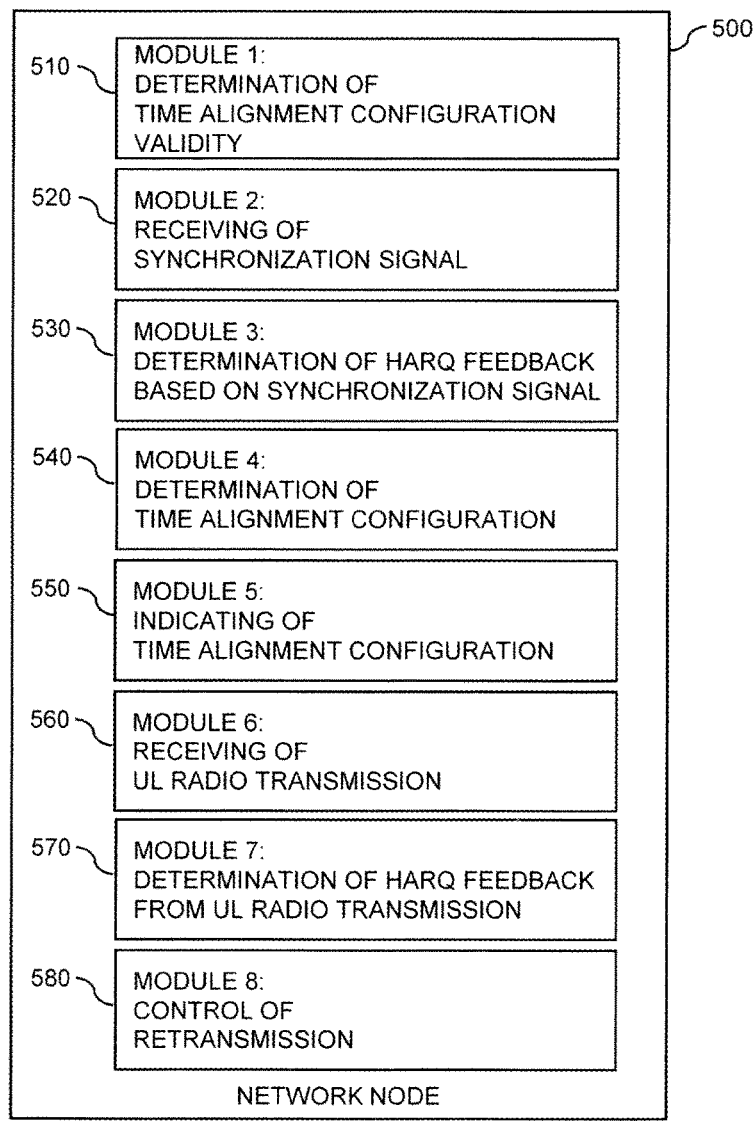
FIG. 5 shows a block diagram for illustrating functionalities of a radio device according to an embodiment of the invention.

FIG. 5 shows a block diagram for illustrating functionalities of a wireless communication network node 500 which operates according to the method of FIG. 4. As illustrated, the node 500 may optionally be provided with a module 510 configured to determine validity of a time alignment configuration for UL radio transmissions from a radio device, such as explained in connection with step 410. Further, the node 500 may be provided with a module 520 configured to receive a synchronization signal, such as explained in connection with step 420. Further, the node 500 may be provided with a module 530 configured to determine HARQ feedback information from the synchronization signal, such as explained in connection with step 430. Further, the node 500 may be provided with a module 540 configured to determine a time alignment configuration for the UL radio transmissions from the synchronization signal, such as explained in connection with step 440. Further, the node 500 may optionally be provided with a module 550 configured to send an indication of the determined time alignment configuration to the radio device, such as explained in connection with step 450. Further, the node 500 may optionally be provided with a module 560 configured to receive a UL radio transmission from the radio device, such as explained in connection with step 470. Further, the node 500 may optionally be provided with a module 570 configured to determine HARQ feedback information from the received UL radio transmission, such as explained in connection with step 480. Further, the node 500 may optionally be provided with a module 580 configured to control retransmission based on the determined HARQ feedback information, such as explained in connection with step 460 and/or step 490.

It is noted that the node 500 may include further modules for implementing other functionalities, such as known functionalities of a base station or similar access node of a wireless communication network. Further, it is noted that the modules of the node 500 do not necessarily represent a hardware structure of the node 500, but may also correspond to functional elements, e.g., implemented by hardware, software, or a combination thereof.

Figure 6:
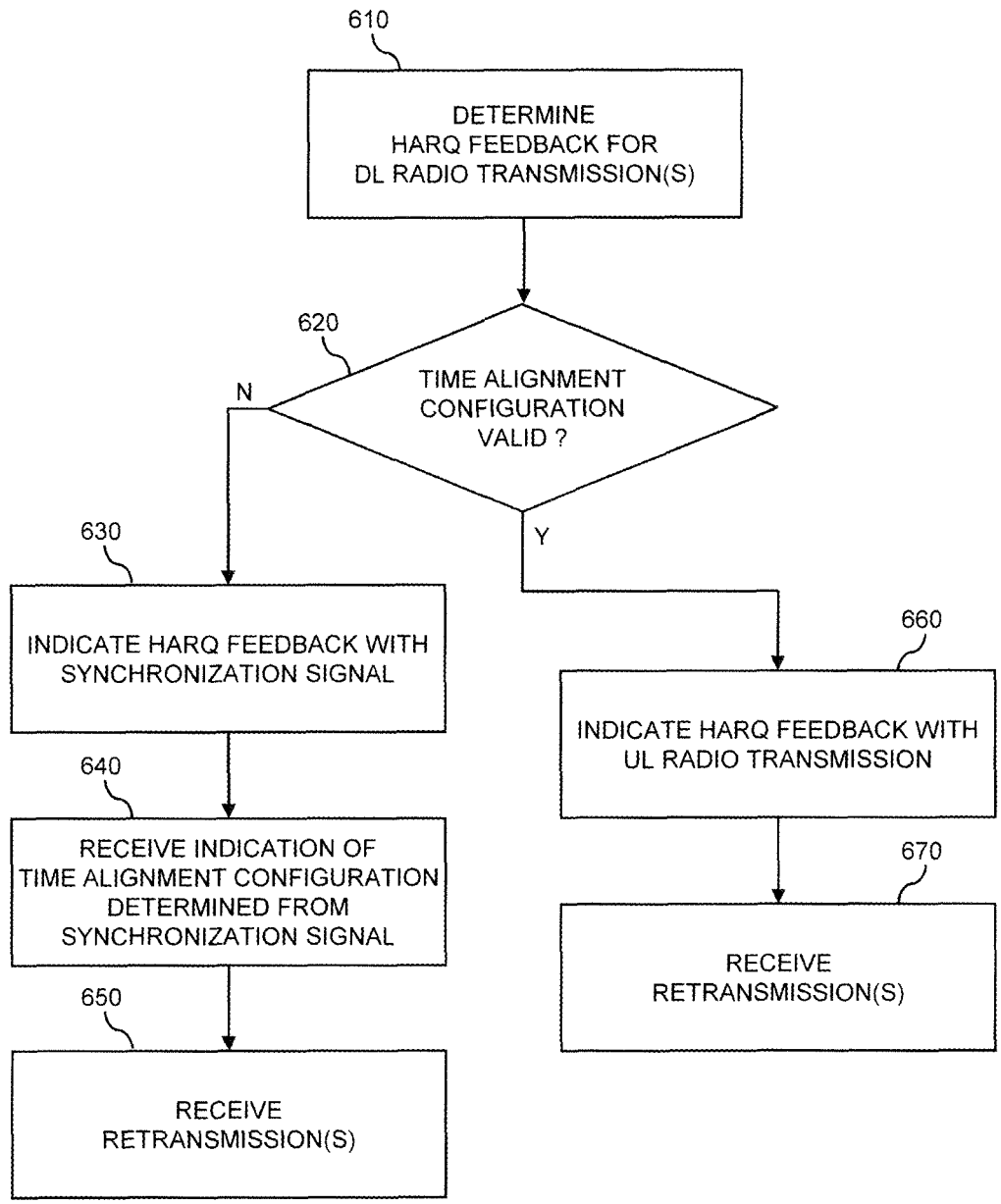
FIG. 6 shows a flowchart for schematically illustrating a further method according to an embodiment of the invention.

FIG. 6 shows a flowchart for illustrating a method of controlling radio transmissions in a wireless communication network. The method of FIG. 6 may be utilized for implementing the illustrated concepts in a radio device, such as the above-mentioned UE 10. If a processor-based implementation of the radio device is used, the steps of the method may be performed by one or more processors of the radio device. In such a case the radio device may further comprise a memory in which program code for implementing the below described functionalities is stored.

At step 610, the radio device determines HARQ feedback information for at least one DL radio transmission from the wireless communication network to the radio device. The radio device may determine the HARQ feedback information depending on whether the at least one DL radio transmission was successfully received, in particular successfully decoded by the radio device. The HARQ feedback information may include a positive acknowledgement indicating successful reception of the at least one DL radio transmission, i.e., an HARQ ACK for the at least one DL radio transmission or a negative acknowledgement indicating failed reception of the at least one DL radio transmission, i.e., an HARQ NACK for the at least one DL radio transmission.

At step 620, the radio device may determine whether the radio device has a valid time alignment configuration for UL radio transmissions from the radio device to the wireless communication network. For example, upon expiry of a timer, a time alignment configuration as previously indicated to the radio device may assumed to be invalid. The time alignment configuration may for example define a TA value to be applied by the radio device for controlling the timing of the UL radio transmissions, e.g., by delaying the UL radio transmission in accordance with the TA value.

If at step 620 the radio device is found to have no valid time alignment configuration, as indicated by branch "N", the method may continue with step 630 to indicate the HARQ feedback information to the wireless communication network. At step 630, the radio device indicates the HARQ feedback information by sending a synchronization signal, such as the above-mentioned USS. The synchronization signal enables a node of the wireless communication network, e.g., the above-mentioned access node 100, to determine the time alignment configuration for UL radio transmissions from the radio device to the wireless communication network. Here it is noted that the synchronization signal may correspond to any kind of signal which may be used for estimating a propagation delay of an UL radio transmission from the radio device to the wireless communication network, including dedicated synchronization signals and random access preambles.

By sending a first type of the synchronization signal, the radio device may send the HARQ feedback information as including a positive acknowledgement indicating successful reception of the at least one DL radio transmission, i.e., as an HARQ ACK for the at least one DL radio transmission. By sending a second type of the synchronization signal, the radio device may send the HARQ feedback information as including a negative acknowledgement indicating failed reception of the at least one DL radio transmission, i.e., as a HARQ NACK for the at least one DL radio transmission. The first type of the synchronization signal and the second type synchronization signal may differ with respect to the radio resources used for transmission of the synchronization signal and/or with respect to a symbol sequence transmitted with the synchronization signal. In some scenarios, not sending the synchronization signal on radio resources configured for the transmission of the synchronization signal may also be used for indicating an HARQ NACK.

In some scenarios, the synchronization signal may enable a node of the wireless communication network to estimate a timing of a non-time aligned UL radio transmission from the radio device and to receive the non-time aligned UL radio transmission based on the estimated timing. In this case, the radio device may also send the HARQ feedback information in such non-time aligned UL uplink radio transmission. An example of corresponding processes is explained in connection with FIG. 3.

In some scenarios, the radio device may request allocation of UL radio resources to the radio device by sending the synchronization signal while the wireless communication network does not expect HARQ feedback information from the radio device, e.g., because there is no unacknowledged DL radio transmission to the radio device. Accordingly, the radio device may also use the synchronization signal for conveying a scheduling request.

By receiving control information from the wireless communication network, the radio device may be configured with respect to the transmission of the synchronization signal, in particular with respect to how the synchronization signal may is to be used for transmission of HARQ feedback information for a DL radio transmission. The control information may indicate UL radio resources for transmission of the synchronization signal. The radio device may receive the control information in DL control information for controlling the at least one DL radio transmission. Alternatively or in addition, the radio device may receive the control information by higher layer signalling, e.g., by RRC signalling and/or by MAC signalling. In some scenarios, the UL radio resources for transmission of the synchronization signal may also depend on DL radio resources used for sending DL control information for controlling the at least one DL radio transmission, e.g., based on a mapping of CCEs of a physical DL control channel to UL resources for transmission of the synchronization signal.

At step 640, the radio device may receive, from the wireless communication network, an indication of a time alignment configuration determined on the basis of the synchronization signal transmitted at step 620. This may for example involve that the radio device receives a timing advance command indicating a TA value. In some scenarios, the radio device may detect that there is no indication of the time alignment configuration in response to sending the synchronization signal and determine from the absence of the indication that no time alignment for UL radio transmissions is needed for the radio device or that the radio device may continue to apply a previous time alignment configuration, e.g., the time alignment configuration which was found to be invalid at step 620.

At step 650, the radio device may receive one or more retransmission(s) of the at least one DL radio transmission. These retransmission(s) may be initiated by the wireless communication network in response to the HARQ feedback information indicated at step 630. For example, if the HARQ feedback information includes an HARQ NACK for the at least one DL radio transmission, the wireless communication network may initiate a retransmission of the at least one DL radio transmission, and the radio device may then receive this retransmission.

If at step 620 the radio device is found to have a valid time alignment configuration, as indicated by branch "Y", the method may continue with step 660 to indicate the HARQ feedback information to the wireless communication network. At step 630, the radio device indicates the HARQ feedback information by sending a time-aligned UL radio transmission to the wireless communication network, i.e., a UL radio transmission which is based on the valid time alignment configuration of the radio device. The UL radio transmission may be a UL radio transmission on a data channel, such as the PUSCH of the LTE radio technology, are a UL radio transmission on a control channel, such as the PUCCH of the LTE radio technology. The UL radio transmission sent at step 660 may be performed in an efficient manner on orthogonal time frequency resources.

At step 670, the radio device may receive one or more retransmission(s) of the at least one DL radio transmission. These retransmission(s) may be initiated by the wireless communication network in response to the HARQ feedback information indicated at step 660. For example, if the HARQ feedback information includes an HARQ NACK for the at least one DL radio transmission, the wireless communication network may initiate a retransmission of the at least one DL radio transmission, and the radio device may then receive this retransmission.

Figure 7:
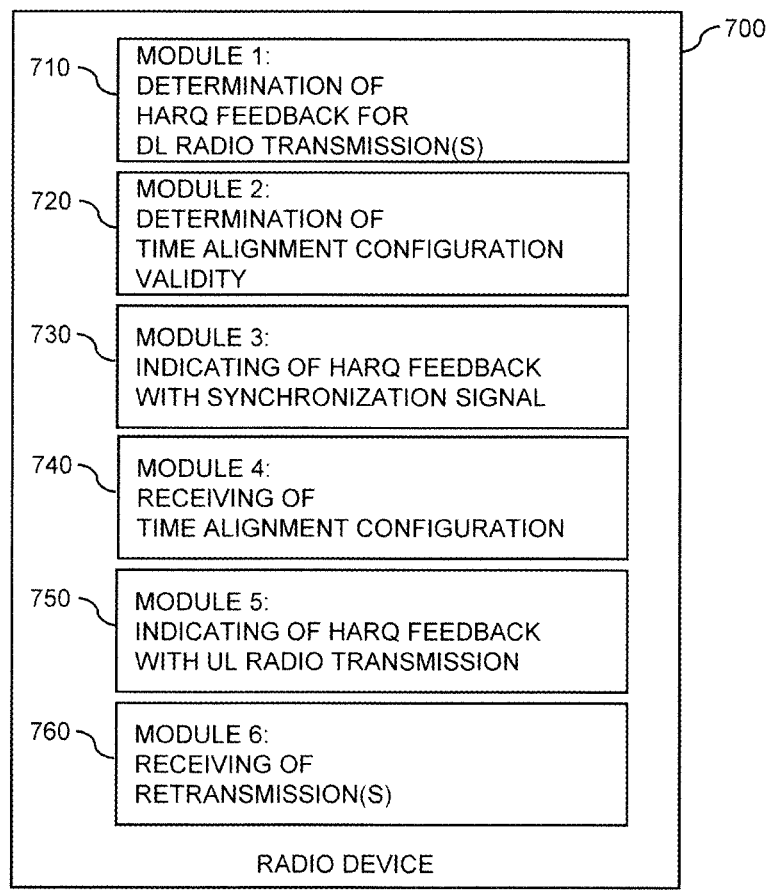
FIG. 7 shows a block diagram for illustrating functionalities of a network node according to an embodiment of the invention.

FIG. 7 shows a block diagram for illustrating functionalities of a radio device 700 which operates according to the method of FIG. 6. As illustrated, the radio device 700 may be provided with a module 710 configured to determine HARQ feedback information, such as explained in connection with step 610. Further, the radio device 700 may optionally be provided with a module 720 configured to determine validity of a time alignment configuration for UL radio transmissions from the radio device 700, such as explained in connection with step 620. Further, the radio device 700 may be provided with a module 730 configured to indicate HARQ feedback information by sending a synchronization signal, such as explained in connection with step 630. Further, the radio device 700 may optionally be provided with a module 740 configured to receive an indication of a time alignment configuration determined on the basis of the synchronization signal, such as explained in connection with step 640. Further, the radio device 700 may be provided with a module 750 configured to indicate HARQ feedback information by sending a UL radio transmission, such as explained in connection with step 660. Further, the radio device 700 may optionally be provided with a module 760 configured to receive one or more retransmissions, such as explained in connection with step 650 and/step 670.

It is noted that the radio device 700 may include further modules for implementing other functionalities, such as known functionalities of a UE or similar user end device. Further, it is noted that the modules of the radio device 700 do not necessarily represent a hardware structure of the radio device 700, but may also correspond to functional elements, e.g., implemented by hardware, software, or a combination thereof.

The methods of FIGS. 4 and 6 may also be combined in a system which includes a radio device and a node of a wireless communication network. In such a system, the radio device may operate according to the method of FIG. 4 and indicate the HARQ feedback information using the synchronization signal. The node of the wireless communication network may in turn receive the synchronization signal and on the one hand use the synchronization signal to determine a time alignment configuration to be used by the radio device for UL radio transmissions, and on the other hand use the synchronization signal to determine the HARQ feedback from the radio device.

Figure 8:
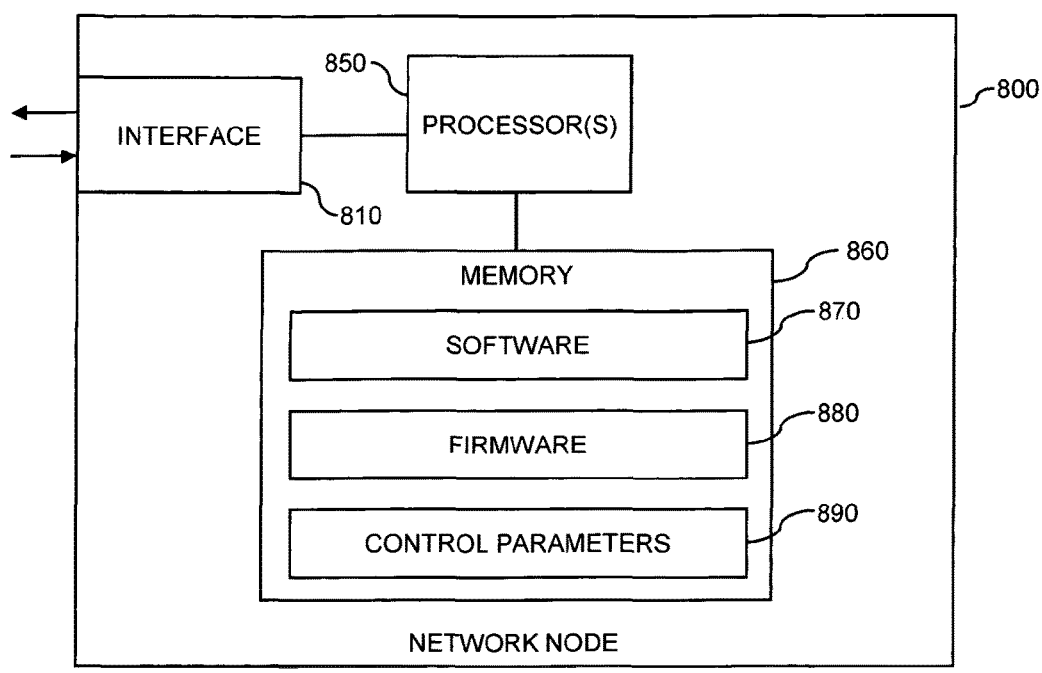
FIG. 8 schematically illustrates structures of a radio device according to an embodiment of the invention.

FIG. 8 illustrates a processor-based implementation of a wireless communication network node 800 which may be used for implementing the above described concepts. For example, the structures as illustrated in FIG. 8 may be used for implementing the above-mentioned access node 100.

As illustrated, the node 800 may include an interface 810 with respect to one or more radio devices, such as the above-mentioned radio device 10. The interface 810 may be a radio interface and be used for sending DL radio transmissions to the radio device(s) and receiving UL radio transmissions from the radio device(s). The interface 810 may also be used for receiving synchronization signals from the radio device(s). Further, the interface 810 may be used for transmission of control information.

Further, the node 800 may include one or more processors 850 coupled to the interface 810 and a memory 860 coupled to the processor(s) 850. By way of example, the control interface 810, the processor(s) 850, and the memory 860 could be coupled by one or more internal bus systems of the node 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 870, firmware 880, and/or control parameters 890. The memory 860 may include suitably configured program code to be executed by the processor(s) 850 so as to implement the above-described functionalities of a wireless communication network node, such as explained in connection with FIG. 4 or 5.

It is to be understood that the structures as illustrated in FIG. 8 are merely schematic and that the node 800 may actually include further components which, for the sake of clarity, have not been illustrated, e.g., further interfaces or processors. Also, it is to be understood that the memory 800 may include further program code for implementing known functionalities of a wireless communication network node, e.g., known functionalities of a base station or similar access node. According to some embodiments, also a computer program may be provided for implementing functionalities of the node 800, e.g., in the form of a physical medium storing the program code and/or other data to be stored in the memory 860 or by making the program code available for download or by streaming.

Figure 9:
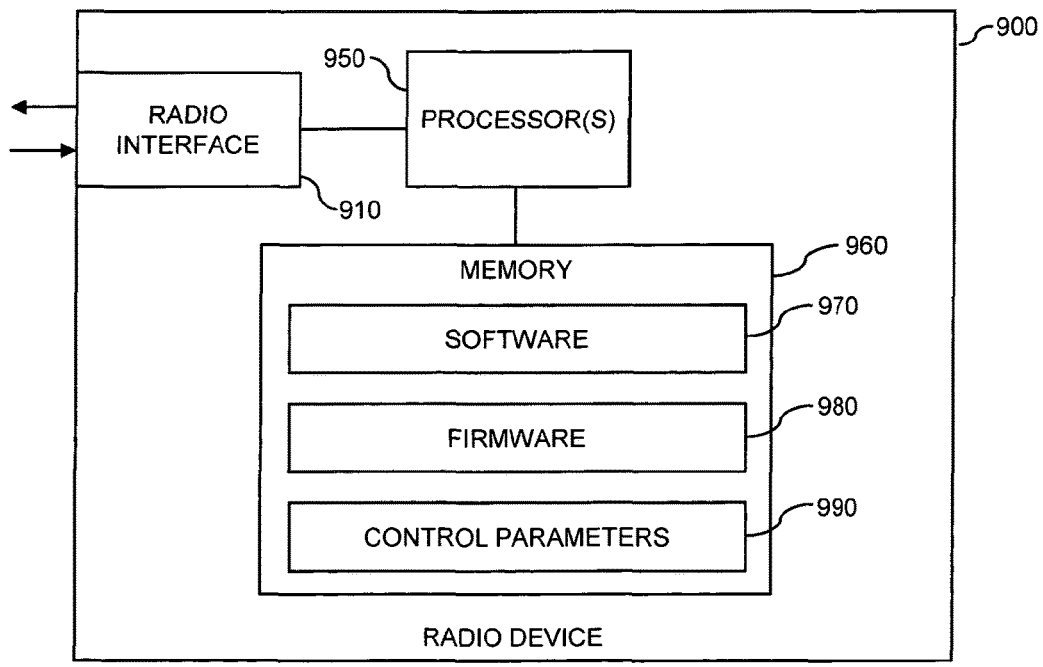
FIG. 9 schematically illustrates structures of a control node according to an embodiment of the invention.

FIG. 9 illustrates a processor-based implementation of a radio device 900 which may be used for implementing the above described concepts. For example, the structures as illustrated in FIG. 9 may be used for implementing the above-mentioned UE 10.

As illustrated, the radio device 900 may include a radio interface 910 for receiving DL radio transmissions from the wireless communication network and for sending DL radio transmissions to the wireless communication network. The radio interface 910 may also be used for sending synchronization signals. The radio interface 910 may also be used for receiving synchronization signals from the radio device(s). Further, the radio interface 910 may be used for transmission of control information.

Further, the radio device 900 may include one or more processors 950 coupled to the radio interface 910 and a memory 960 coupled to the processor(s) 950. By way of example, the radio interface 910, the processor(s) 950, and the memory 960 could be coupled by one or more internal bus systems of the radio device 900. The memory 960 may include a ROM, e.g., a flash ROM, a RAM, e.g., a DRAM or SRAM, a mass storage, e.g., a hard disk or solid state disk, or the like. As illustrated, the memory 960 may include software 970, firmware 980, and/or control parameters 990. The memory 960 may include suitably configured program code to be executed by the processor(s) 950 so as to implement the above-described functionalities of a radio device, such as explained in connection with FIG. 6 or 7.

It is to be understood that the structures as illustrated in FIG. 9 are merely schematic and that the radio device 900 may actually include further components which, for the sake of clarity, have not been illustrated, e.g., further interfaces or processors. Also, it is to be understood that the memory 960 may include further program code for implementing known functionalities of a radio device, e.g., known functionalities of a UE or similar user end device. According to some embodiments, also a computer program may be provided for implementing functionalities of the radio device 900, e.g., in the form of a physical medium storing the program code and/or other data to be stored in the memory 960 or by making the program code available for download or by streaming.

As can be seen, the concepts as described above may be used for efficiently indicating HARQ feedback from a radio device to a wireless communication network, even if the radio device has no valid time alignment configuration for UL radio transmissions to the wireless communication network. By conditionally using the synchronization signal for indicating the HARQ feedback, a valid time alignment configuration does not need to be maintained while there is no DL or UL transmission activity. Rather, HARQ feedback for a DL transmission can be transmitted without further delay due to re-establishment of a valid time alignment configuration. Rather, the valid time alignment configuration can be efficiently re-established by using the synchronization signal which indicates the HARQ feedback.

It is to be understood that the examples and embodiments as explained above are merely illustrative and susceptible to various modifications. For example, the illustrated concepts may be applied in connection with various kinds of wireless communication technologies, without limitation to the above-mentioned examples of the LTE technology or NR technology. Further, the illustrated concepts may be applied with respect to various kinds of radio devices, including mobile phones, portable computing devices, machine type communication devices, base stations, and relay stations. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of controlling radio transmissions in a wireless communication network, the method comprising:
a node of the wireless communication network receiving a non-time aligned synchronization signal from a radio device;
the node determining, based on the received synchronization signal, a time alignment configuration for uplink radio transmissions from the radio device to the wireless communication network;
the node determining, based on a non-time aligned uplink radio transmission from the radio device, Hybrid Automatic Repeat Request feedback information for at least one downlink radio transmission from the wireless communication network to the radio device; wherein the non-time aligned uplink radio transmission is:
the synchronization signal which conveys the Hybrid Automatic Repeat Request feedback information; or
a non-time aligned further uplink signal, which conveys the Hybrid Automatic Repeat Request feedback information, transmitted by the radio device after the non-time aligned synchronization signal; and
the node controlling, based on the determined Hybrid Automatic Repeat Request feedback information, retransmission of the at least one downlink radio transmission.

2. The method of claim 1, further comprising, in response to determining that the time alignment configuration of the radio device is valid, the node determining Hybrid Automatic Repeat Request feedback information for acknowledgement of at least one downlink radio transmission from the wireless communication network to the radio device based on at least one of the uplink radio transmissions from the radio device.

3. The method of claim 1, further comprising, in response to determining that the time alignment configuration of the radio device is invalid, the node determining Hybrid Automatic Repeat Request feedback information for acknowledgement of at least one downlink radio transmission from the wireless communication network to the radio device based on the synchronization signal.

4. The method of claim 1, further comprising:
in response to detecting a first type of the synchronization signal, the node determining the Hybrid Automatic Repeat Request feedback information as including a positive acknowledgement indicating successful reception of the at least one downlink radio transmission; and
in response to detecting a second type of the synchronization signal, the node determining the Hybrid Automatic Repeat Request feedback information as including a negative acknowledgement indicating failed reception of the at least one downlink radio transmission.

5. The method of claim 1, further comprising:
based on the synchronization signal, the node estimating a timing of the further non-time aligned uplink signal from the radio device;
based on the estimated timing, the node receiving the further non-time aligned uplink signal; and
the node determining the Hybrid Automatic Repeat Request feedback information from the further non-time aligned uplink signal from the radio device.

6. The method of claim 1, further comprising, in response to detecting the synchronization signal while not expecting Hybrid Automatic Repeat Request feedback information from the radio device, the node allocating uplink radio resources to the radio device and indicating the allocated uplink radio resources to the radio device.

7. A method of controlling transmissions in a wireless communication network, the method comprising:
a radio device determining Hybrid Automatic Repeat Request feedback information for at least one downlink radio transmission from the wireless communication network to the radio device;
by sending a non-time aligned uplink radio transmission, the radio device indicating the Hybrid Automatic Repeat Request feedback information to the wireless communication network; wherein the non-time aligned uplink radio transmission indicating the Hybrid Automatic Repeat Request feedback information is:
a non-time aligned synchronization signal from the radio device; or
a non-time aligned further uplink signal transmitted by the radio device after the non-time aligned synchronization signal; and
wherein the synchronization signal enables a node of the wireless communication network to determine a time alignment configuration for uplink radio transmissions from the radio device to the wireless communication network.

8. The method of claim 7, further comprising, in response to determining that the time alignment configuration of the radio device is valid, the radio device sending Hybrid Automatic Repeat Request feedback information for acknowledgement of at least one downlink radio transmission from the wireless communication network to the radio device based on at least one of the uplink radio transmissions from the radio device.

9. The method of claim 7, further comprising, in response to determining that the time alignment configuration of the radio device is invalid, the radio device sending Hybrid Automatic Repeat Request feedback information for acknowledgement of at least one downlink radio transmission from the wireless communication network to the radio device based on the synchronization signal.

10. The method of claim 7, further comprising:
by sending a first type of the synchronization signal, the radio device sending the Hybrid Automatic Repeat Request feedback information as a positive acknowledgement indicating successful reception of the at least one downlink radio transmission; and by sending a second type of the synchronization signal, the radio device sending the Hybrid Automatic Repeat Request feedback information as a negative acknowledgement indicating failed reception of the at least one downlink radio transmission.

11. The method of claim 7, further comprising:
the radio device sending the Hybrid Automatic Repeat Request feedback information in the non-time aligned further uplink signal to the wireless communication network;
wherein the synchronization signal enables a node of the wireless communication network to estimate a timing of the non-time aligned further uplink signal and receive the further uplink signal based on the estimated timing.

12. The method of claim 7, further comprising the radio device requesting allocation of uplink radio resources to the radio device by sending the synchronization signal while the wireless communication network does not expect Hybrid Automatic Repeat Request feedback information from the radio device.

13. A node for a wireless communication network, the node comprising:
processing circuitry;
memory containing instructions executable by the processing circuitry whereby the node is operative to:
receive a non-time aligned synchronization signal from a radio device;
determine, based on the received synchronization signal, a time alignment configuration for uplink radio transmissions from the radio device to the wireless communication network;
determine, based on a non-time aligned uplink radio transmission from the radio device, Hybrid Automatic Repeat Request feedback information for at least one downlink radio transmission from the wireless communication network to the radio device;
wherein the non-time aligned uplink radio transmission is:
the synchronization signal which conveys the Hybrid Automatic Repeat Request feedback information; or
a non-time aligned further uplink signal, which conveys the Hybrid Automatic Repeat Request feedback information, transmitted by the radio device after the non-time aligned synchronization signal; and
control, based on the determined Hybrid Automatic Repeat Request feedback information, retransmission of the at least one downlink radio transmission.

14. The node of claim 13, wherein the instructions are such that the node is operative to, in response to determining that the time alignment configuration of the radio device is valid, determine Hybrid Automatic Repeat Request feedback information for acknowledgement of at least one downlink radio transmission from the wireless communication network to the radio device based on at least one of the uplink radio transmissions from the radio device.

15. The node of claim 13, wherein the instructions are such that the node is operative to, in response to determining that the time alignment configuration of the radio device is invalid, determine Hybrid Automatic Repeat Request feedback information for acknowledgement of at least one downlink radio transmission from the wireless communication network to the radio device based on the synchronization signal.

16. The node of claim 13, wherein the instructions are such that the node is operative to:
in response to detecting a first type of the synchronization signal, determine the Hybrid Automatic Repeat Request feedback information as including a positive acknowledgement indicating successful reception of the at least one downlink radio transmission; and
in response to detecting a second type of the synchronization signal, determine the Hybrid Automatic Repeat Request feedback information as including a negative acknowledgement indicating failed reception of the at least one downlink radio transmission.

17. The node of claim 13, wherein the instructions are such that the node is operative to:
based on the synchronization signal, estimate a timing of the non-time aligned further uplink signal from the radio device;
based on the estimated timing, receive the further non-time aligned uplink signal; and
determine the Hybrid Automatic Repeat Request feedback information from the non-time aligned further uplink signal from the radio device.

18. The node of claim 13, wherein the instructions are such that the node is operative to, in response to detecting the synchronization signal while not expecting Hybrid Automatic Repeat Request feedback information from the radio device, allocate uplink radio resources to the radio device and indicating the allocated uplink radio resources to the radio device.

19. A radio device, the radio device comprising:
processing circuitry;
memory containing instructions executable by the processing circuitry whereby the radio device is operative to:
determine Hybrid Automatic Repeat Request feedback information for at least one downlink radio transmission from a wireless communication network to the radio device; and
by sending a non-time aligned uplink radio transmission, indicate the Hybrid Automatic Repeat Request feedback information to the wireless communication network; wherein the non-time aligned uplink radio transmission indicating the Hybrid Automatic Repeat Request feedback information is:
a non-time aligned synchronization signal from the radio device; or
a non-time aligned further uplink signal transmitted by the radio device after the non-time aligned synchronization signal; and
wherein the synchronization signal enables a node of the wireless communication network to determine a time alignment configuration for uplink radio transmissions from the radio device to the wireless communication network.

20. The radio device of claim 19, wherein the instructions are such that the radio device is further operative to, in response to determining that the time alignment configuration of the radio device is valid, send Hybrid Automatic Repeat Request feedback information for acknowledgement of at least one downlink radio transmission from the wireless communication network to the radio device based on at least one of the uplink radio transmissions from the radio device.

21. The radio device of claim 19, wherein the instructions are such that the radio device is further operative to, in response to determining that the time alignment configuration of the radio device is invalid, send Hybrid Automatic Repeat Request feedback information for acknowledgement of at least one downlink radio transmission from the wireless communication network to the radio device based on the synchronization signal.

22. The radio device of claim 19, wherein the instructions are such that the radio device is further operative to:
by sending a first type of the synchronization signal, send the Hybrid Automatic Repeat Request feedback information as a positive acknowledgement indicating successful reception of the at least one downlink radio transmission; and
by sending a second type of the synchronization signal, send the Hybrid Automatic Repeat Request feedback information as a negative acknowledgement indicating failed reception of the at least one downlink radio transmission.

23. The radio device of claim 19:
wherein the instructions are such that the radio device is further operative to send the Hybrid Automatic Repeat Request feedback information in the non-time aligned further uplink signal to the wireless communication network;
wherein the synchronization signal enables a node of the wireless communication network to estimate a timing of the non-time aligned further uplink signal and receive the non-time aligned further uplink signal based on the estimated timing.

24. The radio device of claim 19, wherein the instructions are such that the radio device is further operative to request allocation of uplink radio resources to the radio device by sending the synchronization signal while the wireless communication network does not expect Hybrid Automatic Repeat Request feedback information from the radio device.

25. A non-transitory computer readable recording medium storing a computer program product for controlling radio transmissions in a wireless communication network, the computer program product comprising software instructions which, when run on processing circuitry of a node of the wireless communication network, causes the node to:
receive a non-time aligned synchronization signal from a radio device;
determine, based on the received synchronization signal, a time alignment configuration for uplink radio transmissions from the radio device to the wireless communication network;
determine, based on a non-time aligned uplink radio transmission from the radio device, Hybrid Automatic Repeat Request feedback information for at least one downlink radio transmission from the wireless communication network to the radio device; wherein the non-time aligned uplink radio transmission is:
the synchronization signal which conveys the Hybrid Automatic Repeat Request feedback information; or
a non-time aligned further uplink signal, which conveys the Hybrid Automatic Repeat Request feedback information, transmitted by the radio device after the non-time aligned synchronization signal; and
control, based on the determined Hybrid Automatic Repeat Request feedback information, retransmission of the at least one downlink radio transmission.

26. A non-transitory computer readable recording medium storing a computer program product for controlling transmissions in a wireless communication network, the computer program product comprising software instructions which, when run on processing circuitry of a radio device, causes the radio device to:
determine Hybrid Automatic Repeat Request feedback information for at least one downlink radio transmission from the wireless communication network to the radio device;
indicate, by sending a non-time aligned uplink radio transmission, the Hybrid Automatic Repeat Request feedback information to the wireless communication network; wherein the non-time aligned uplink radio transmission indicating the Hybrid Automatic Repeat Request feedback information is;
a non-time aligned synchronization signal from the radio device; or
a non-time aligned further uplink signal transmitted by the radio device after the non-time aligned synchronization signal; and
wherein the synchronization signal enables a node of the wireless communication network to determine a time alignment configuration for uplink radio transmissions from the radio device to the wireless communication network.

\* \* \* \* \*